May 15, 1928.
J. E. WIHLFAHRT
1,669,962
APPARATUS FOR MAKING DOUGH
Original Filed Oct. 29, 1925
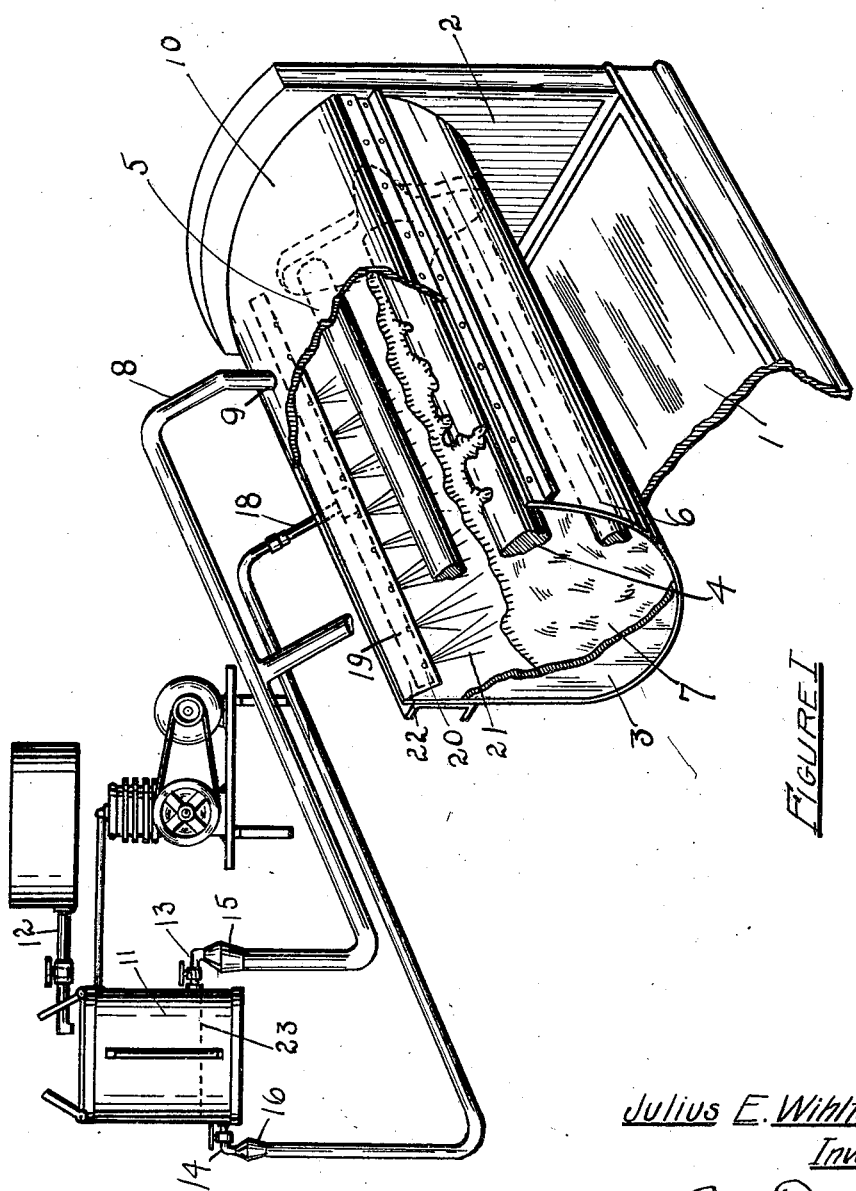
*Julius E. Wihlfahrt,*
Inventor,
*R.o.a.Darrah,*
Attorney.

Patented May 15, 1928.

1,669,962

UNITED STATES PATENT OFFICE.

JULIUS E. WIHLFAHRT, OF NEW YORK, N. Y.

APPARATUS FOR MAKING DOUGH.

Original application filed October 29, 1925, Serial No. 65,699. Divided and this application filed May 21, 1926. Serial No. 110,781.

This application is a division of application Serial #65,699, filed by me on October 29, 1925.

My invention relates to dough mixers such as are ordinarily used in commercial bakeries.

It is the object of my invention to provide an equipment which permits the manufacture of an improved quality of bread, while using a smaller amount of power to operate the mixer and with a smaller amount of resultant heating.

My invention also permits a more thorough incorporation of the ingredients of the dough, by reason of affording a longer mixing period. My invention also results in greater uniformity and greater ease of control of the mixing process, as well as a better product. Other objects of my invention will appear from the specification, drawings, and claims, submitted hereto.

Referring to the drawing, Figure I shows a diagrammatic view of my invention the equipment being indicated as partially broken away and partially in section. In the drawing, (1) indicates a base or support for a dough mixer on which are placed upright frames (2) which serve to support shell (3) in which the ingredients are mixed to form a dough.

A central shaft (4) is mounted to rotate within shell (3) and carry auxiliary mixing arms (5) and (6).

The dough is indicated by reference #7.

Water is fed into the shell (3) through pipe connection (8) which enters by hole (9) in the top of the mixer (10).

The type of mixer which I have shown and here describe is not essential to my invention as many kinds of dough mixer may be equipped with apparatus for carrying out my invention. I have merely chosen for purposes of illustration a typical form of dough mixer which I have found to be satisfactory.

Tank (11) represents diagrammatically the scale tank or measuring device, whereby, the water used in the dough is measured.

Scale tank (11) may be hung from a standard weighing device or balanced, or measurements by means of a sight feed may be employed. In the drawing, (12) represents the source of supply from which the water is fed in the scale tank (11).

Scale tank (11) is provided with two cocks (13) and (14) one of which feed into funnel (15) at the end of pipe (8) while the other discharges into funnel (16) at the end of pipe (17). Pipe (17) is connected by means of a flexible joint (18) to distributing pipe (19) located along the top edge of the shell of the dough mixer. Distributing pipe (19) is provided with a series of holes (20) located preferably on its under side, and so arranged that the water in flowing out of pipe (19) would be directed against the side of dough mixer shell (3) serving to both cool and lubricate the shell.

Sprays (21) indicate diagrammatically a flow of liquid from holes (20) in pipe (19). Obviously this liquid may if desired be oil, lard, or emulsions, but for commercial purposes I have found water to be very satisfactory. A plate or shield (22) is shown covering and protecting distributing pipe (19). Plate (22) may be of any desired form, its prime object being to prevent pipe (19) from becoming clogged with dough or other ingredients or broken or displaced by the mechanical force of the dough during the mixing period.

A dotted line (23) is shown in tank (11). This line indicates diagrammatically the level of water or other liquid which would run out of tank (11) by opening valve (13). The water below the dotted line (23) would only be drawn out of tank (11) by opening valve (14).

In the operation of my process and equipment I proportion the amount of water above the dotted line in tank (11) to the amount of water below the doted line in tank (11) such that the smaller quantity would be about 10% of the total. I do not wish to be confined to this quantity as different doughs will require varying amounts of water and different grades of flour, or other ingredients will also change the ratio.

In operating my device, I first add the amount of water above dotted line (23) in tank (11) by opening cock (13) allowing this water to flow into shell (3).

The other desired ingredients may be added now or prior to the addition of the water mentioned above.

The dough mixer is then set in rotation and the mixing of the ingredients is begun.

As the mixing proceeds, the dough becomes stiffer and thicker causing a greater resistance to the rotation of the mixing device, and obviously producing a greater amount of heat.

In most commercial mixers the prime source of friction is found to reside between the mass of dough and the walls of the shell (3). By the term, "walls" I intend to include the sides, ends, bottom, etc. of shell (3).

I have found that by introducing a film of water close to the side of shell (3) as for example, as shown in Figure I by jets (21) friction is materially reduced, heating of the dough is much less rapid, longer mixing periods are practical, and a much improved dough results. Incidentally, the degree of hydration of the dough is increased owing to the more uniform distribution of water.

Further, since it is a custom to employ cold water in the mixing of doughs, it will be apparent that the jets of cold water entering from distributing pipe (19) serve also to cool the shell.

It will be apparent that the water used to lubricate and cool the sides of shell (3) may be sprayed in under air pressure if desirable or may be allowed to flow in by gravity, also as previously mentioned other materials may be added with the water through distributing pipe (19) or in place of the water.

If desired also the lubricating and cooling medium may be added continuously over the entire period of the mix or may be added principally in any desired portion of the mix.

This factor may, of course, be controlled by the manipulation of cock (14).

It will be apparent that many modifications of this process may be made, without departing from the spirit of this invention. Other types of dough mixers than that shown in Figure I, may be employed and the process may, of course, be applied to many other materials than the instance shown for illustration; namely the manufacture of dough for bakery purposes. I do not wish to be restricted to the exact structure shown or the exact steps described herein.

Having now fully described my invention what I now claim as new and wish to secure by Letters of Patent in the United States is as follows:

1. A mixer consisting of a frame, a shell, a mixing element within said shell, an inlet for fluids in its top portion, and additional independent means for directing a lubricant between said shell and the material being mixed.

2. A mixer consisting of a frame, a shell, a mixing element within said shell, an inlet for admitting fluids to said shell and an additional independent distributing duct within said shell and arranged to distribute a liquid along said shell.

3. A mixer consisting of a frame, a shell, a mixing element within said shell, a fluid inlet into said shell, and a stationary substantially horizontal perforated duct within said shell connected to an independent inlet arranged horizontally of said shell to distribute a liquid on said shell.

4. An equipment for mixing dough, consisting of a frame, a shell supported by said frame, a mixing element rotatable within said shell, a source of water supply connected directly to said shell, a perforated distributing pipe, located longitudinally of said shell and adjacent to one of the sides of said shell, and an independent connection from said source of water supply to said perforated distributing pipe, an independent means for controlling the flow of water from said source of water supply to said shell and to said duct.

5. An equipment for mixing dough, consisting of a frame, a shell supported by said frame, a mixing element movable in said shell, a perforated distributing pipe located longitudinally of said shell and adjacent to one of the sides of said shell, a shield for protecting said pipe from the dough, said perforated distributing pipe being arranged, so that the perforations direct the flow of liquid substantially vertically and downward between the adjacent side of the shell and the dough.

JULIUS E. WIHLFAHRT.